US006586128B1

(12) United States Patent
Johnson et al.

(10) Patent No.: US 6,586,128 B1
(45) Date of Patent: Jul. 1, 2003

(54) DIFFERENTIAL PRESSURE FLUID FLOW FIELDS FOR FUEL CELLS

(75) Inventors: Mark C. Johnson, Phoenix, AZ (US); David P. Wilkinson, North Vancouver (CA); John Kenna, Vancouver (CA); Olen R. Vanderleeden, Coquitlam (CA); Joerg Zimmerman, Vancouver (CA); Mehrzad Tabatabaian, Port Moody (CA)

(73) Assignee: Ballard Power Systems, Inc., Burnaby (CA)

( * ) Notice: Subject to any disclaimer, the term of this patent is extended or adjusted under 35 U.S.C. 154(b) by 0 days.

(21) Appl. No.: 09/567,500

(22) Filed: May 9, 2000

(51) Int. Cl.$^7$ .............................. H01M 2/02; H01M 8/02
(52) U.S. Cl. .............................. 429/34; 429/38; 429/13
(58) Field of Search .............................. 429/34, 38, 39, 429/17, 25, 26, 13

(56) References Cited

U.S. PATENT DOCUMENTS

| 4,631,239 A | * 12/1986 | Spurrier et al. ................ 429/39 |
| 4,853,301 A | 8/1989 | Granata, Jr. et al. ........... 429/39 |
| 5,108,849 A | 4/1992 | Watkins et al. ................ 429/30 |
| 5,260,143 A | 11/1993 | Voss et al. .................... 429/13 |
| 5,366,818 A | 11/1994 | Wilkinson et al. ............. 429/13 |
| 5,441,819 A | 8/1995 | Voss et al. .................... 429/13 |
| 5,641,586 A | 6/1997 | Wilson ......................... 429/30 |
| 5,686,199 A | * 11/1997 | Cavalca et al. ................ 429/30 |
| 5,795,665 A | 8/1998 | Allen ........................... 429/12 |
| 6,146,780 A | * 11/2000 | Cisar et al. .................... 429/34 |

FOREIGN PATENT DOCUMENTS

| EP | 415733 | * 6/1991 | ............ H01M/8/02 |
| EP | 0 924 785 | 6/1999 | |
| JP | 62-040169 | 2/1987 | |
| JP | 06-181576 | 2/1996 | |
| JP | 11-233125 | 8/1999 | |

* cited by examiner

Primary Examiner—Stephen Kalafut
Assistant Examiner—Raymond Alejandro
(74) Attorney, Agent, or Firm—McAndrews, Held & Malloy, Ltd.

(57) ABSTRACT

Flow fields comprising a set of fluid distribution channels may be employed in fuel cells for purposes of distributing fluid reactants to an electrochemically active area of the fuel cell. Water management and reactant distribution may be improved by increasing pressure gradients between adjacent channels. Such pressure gradients may be increased by engineering the channels such that the resistance to reactant flow differs along the length of adjacent channels.

27 Claims, 7 Drawing Sheets

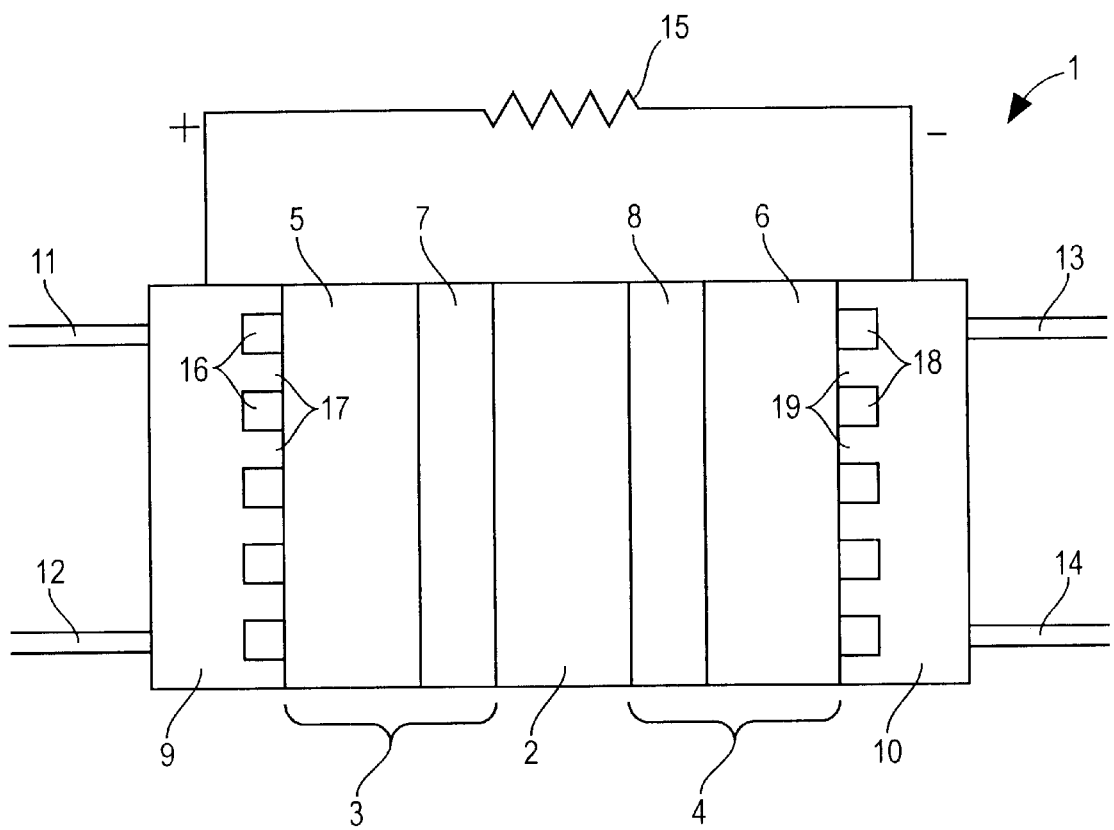

DIFFERENTIAL PRESSURE FLUID FLOW FIELDS FOR FUEL CELLS

FIELD OF THE INVENTION

The present invention relates to fluid flow fields for fuel cells. More particularly, it relates to flow field designs for improving water management and reactant distribution in solid polymer electrolyte fuel cells.

BACKGROUND OF THE INVENTION

Fuel cell systems are currently being developed for use as power supplies in numerous applications, such as automobiles and stationary power plants. Such systems offer promise of economically delivering power with environmental and other benefits.

Fuel cells convert reactants, namely fuel and oxidants, to generate electric power and reaction products. Fuel cells generally employ an electrolyte disposed between two electrodes, namely a cathode and an anode. A catalyst typically induces the desired electrochemical reactions at the electrodes. Preferred fuel cell types include solid polymer electrolyte fuel cells that comprise a solid polymer electrolyte and operate at relatively low temperatures.

During normal operation of a solid polymer electrolyte fuel cell, fuel is electrochemically oxidized at the anode catalyst, typically resulting in the generation of protons, electrons, and possibly other species depending on the fuel employed. The protons are conducted from the reaction sites at which they are generated, through the electrolyte, to electrochemically react with the oxidant at the cathode catalyst. The catalysts are preferably located at the interfaces between each electrode and the adjacent electrolyte.

A broad range of fluid reactants can be used in solid polymer electrolyte fuel cells and may be supplied in either gaseous or liquid form. For example, the oxidant stream may be substantially pure oxygen gas or a dilute oxygen stream such as air. The fuel may be, for example, substantially pure hydrogen gas, a gaseous hydrogen-containing reformate stream, or an aqueous liquid methanol mixture in a direct methanol fuel cell. Reactants are directed to the fuel cell electrodes and are distributed to catalyst therein by means of fluid diffusion layers. In the case of gaseous reactants, these layers are referred to as gas diffusion layers.

Solid polymer electrolyte fuel cells employ a membrane electrode assembly ("MEA") which comprises the solid polymer electrolyte or ion-exchange membrane disposed between the two electrodes. Each electrode contains a catalyst layer, comprising an appropriate catalyst, located next to the solid polymer electrolyte. The catalyst may, for example, be a metal black, an alloy or a supported metal catalyst, for example, platinum on carbon. The catalyst layer typically contains ionomer, which may be similar to that used for the solid polymer electrolyte (for example, Nafion®). The catalyst layer may also contain a binder, such as polytetrafluoroethylene. The electrodes may also contain a substrate (typically a porous electrically conductive sheet material) that may be employed for purposes of mechanical support and/or reactant distribution, thus serving as a fluid diffusion layer.

The MEA is typically disposed between two plates to form a fuel cell assembly. The plates act as current collectors and provide support for the adjacent electrodes. The assembly is typically compressed to ensure good electrical contact between the plates and the electrodes, in addition to good sealing between fuel cell components. A plurality of fuel cell assemblies may be combined in series or in parallel to form a fuel cell stack. In a fuel cell stack, a plate may be shared between two adjacent fuel cell assemblies, in which case the plate also serves as a separator to fluidly isolate the fluid streams of the two adjacent fuel cell assemblies.

In a fuel cell, flow fields are employed for purposes of directing reactants across the surfaces of the fluid diffusion electrodes or electrode substrates. Flow fields are disposed on each side of the MEA and comprise fluid distribution channels. The channels provide passages for the distribution of reactant to the electrode surfaces and also for the removal of reaction products and depleted reactant streams. The flow fields may be incorporated in the current collector/support plates on either side of the MEA (in which case the plates are known as flow field plates) or, alternatively, may be integrated in fluid distribution layers of the electrodes (in which case, the flow field is also the fluid diffusion layer and distributes reactant to the catalyst layer).

In solid polymer electrolyte fuel cells, proper flow field design is important not only for appropriate reactant distribution but also for management of the water produced from the electrochemical reactions of the fuel cell. If reaction product water accumulates within either the reactant flow field channels or the reactant distribution layers in the electrodes, the water may prevent the reactants from accessing the catalyst at the membrane-electrode interface, causing a decrease in fuel cell performance. (The voltage of a fuel cell at a particular current density is a measure of performance. At a given current density, higher cell voltage signifies higher performance.)

For purposes of water management, a higher pressure differential (that is, pressure drop) between a reactant flow field channel inlet and outlet may be used to reduce or eliminate the accumulation of product water; see, for example, U.S. Pat. Nos. 5,260,143, 5,366,818, and 5,441,819 which are hereby incorporated by reference in their entirety. However, the use of a higher pressure differential should be balanced against the larger parasitic energy demand associated with providing pressurized reactant. Other methods employed include use of a temperature rise from inlet to outlet to remove water with a reduced parasitic load.

Various flow field designs have been employed in fuel cell constructions. For instance, flow field plates have been employed which comprise a plurality of substantially straight parallel channels (for example, General Electric and Hamilton Standard LANL No. 9-X53-D6272-1 (1984)). The inlet and outlet ends of the channels are connected to inlet and outlet manifolds respectively. There are several advantages associated with substantially straight channels. For example, one advantage is that, compared to non-linear channels where there may be eddies near bends in the channel, straight channels provide less places for water to accumulate in the channels. Another advantage is that there is less turbulence in fluids flowing in the channels since there are no corners. Further, plates with straight parallel channel flow fields may be easier to manufacture than those with more complex shaped flow fields. Such flow fields however do not have a substantial pressure differential between adjacent channels.

Flow field plates have also been employed which comprise one or more parallel serpentine channels. The use of serpentine channels allows the channel length to be increased and hence allows the pressure differential between inlet and outlet to be increased without having to reduce the channel cross-sectional area; see for example U.S. Pat. No. 5,108,849, which is incorporated herein by reference in its entirety. Flow field plates employing serpentine channels typically have a pressure differential between adjacent channels or channel portions. This pressure differential arises from the presence of bends in the channels which results in adjacent channel portions being somewhat different in length from the inlet manifold.

Flow field plates have also been employed which comprise interdigitated inlet and outlet channels for reactant gases; see for example U.S. Pat. No. 5,641,586. The inlet channels may be connected to an inlet manifold and the outlet channels connected to an outlet manifold. However, in U.S. Pat. No. 5,641,586 the inlet channels and the outlet channels are separate and the reactant gas also traverses a macroporots material between them. Proper reactant distribution in an interdigitated flow field plate relies on pressure differentials between inlet channels and outlet channels, but there is no teaching or suggestion that it is advantageous for the inlet channels to have pressure differentials among themselves.

A variety of other flow field designs and/or modifications of the preceding have been proposed in the art in order to improve water management (water removal) and/or reactant distribution to the electrodes and hence to improve fuel cell performance. Generally though, the individual channels themselves are uniform over most of their length and thus the resistance to flow in the individual channels is uniform over most of their length. (Exceptions however include the short channel length portions at bends in a serpentine flow field or locations in which a channel branches into two or more channels.)

SUMMARY OF THE INVENTION

Increasing the pressure differentials between adjacent reactant channels in a fuel cell flow field can provide for improved fuel cell performance. The performance improvement may result from either improved water management or improved reactant distribution to electrodes in the fuel cell. The pressure differentials serve to drive reactant into and/or water out of regions not in direct fluid contact with the channels themselves (for example, regions of a diffusion layer that are supported by and in direct contact with the landings that separate the channels in a typical flow field plate). The pressure differentials may be increased by engineering adjacent channels such that the resistance to reactant flow differs locally along their length.

Flow fields are employed to supply fluid reactants to the electrochemically active areas of the fuel cell. In flow fields which comprise at least two adjacent fluid distribution channels and in which each of the two adjacent channels is connected at an inlet end to an inlet manifold, the pressure at the inlet ends of both channels is essentially the same. In a like manner, in flow fields in which each of the two adjacent channels is connected at an exhaust end to an outlet manifold, the pressure at the outlet ends of both channels is also essentially the same. Local pressure differentials may be increased between adjacent channels (including an increase from zero by inducing a pressure differential) over a substantial portion of channel length by using a channel design in which the resistance to flow of the fluid reactant along at least one of the two adjacent channels varies from inlet to outlet (that is, the resistance is not constant over the entire channel lengths) and in which the resistance to flow of the fluid reactant differs between each of the two adjacent channels over that channel length portion. Preferably, a channel design is selected such that pressure differentials are induced or increased over most of the length of the channels.

Preferably, the resistance to flow in the channels is varied by varying a geometric characteristic of the cross sections of the channels. For instance, flow resistance may be varied by varying the width, depth, or other shape characteristic of the channel cross section. Thus, pressure differentials may be induced or increased by designing flow field channels such that the cross sections of adjacent channels differ locally along most of the channel length. Preferably, the channel design still provides for essentially similar mass flow of fluid reactant in each channel.

For instance, a pressure differential may be induced between two otherwise straight parallel adjacent channels by decreasing the width of one of the two channels monotonically from its inlet end to its outlet end and by doing the opposite (that is, increasing the width monotonically) in the other channel. The term monotonically, as used herein, does not necessarily mean constantly or uniformly. For example, if a channel decreases in width monotonically, it means that it does not increase in width. Similarly, a pressure differential may be induced by decreasing the channel depth monotonically in one channel and by doing the opposite (that is, increasing the channel depth monotonically) in the adjacent channel.

The variation in channel cross section need not be monotonic however. Instead, the cross sections in one or both of two adjacent channels may vary cyclically and also result in increased local pressure differences over most of the length of the channels. For instance, the geometric characteristic of one of two adjacent channel cross sections (for example, width and/or depth) may vary cyclically in some way with channel length while that of the other channel varies cyclically with the same period but out of phase with its neighbor. Preferably, the other channel varies half a cycle out of phase with its neighbor. The cyclical variation may simply involve varying the geometric characteristic of the cross sections between two discrete values (for example, two different widths). Alternatively, a more complex repeating shape for the cross section may be employed, such as a repeating hour glass shape.

The performance of flow fields comprising two or more parallel channels may be improved in this way. In prior art flow fields with substantially linear, parallel, uniform channels, there may be no significant local pressure differential between adjacent channels. However, by appropriately varying flow resistance in the channels, pressure differentials may desirably be increase in such flow fields. In prior art flow fields with serpentine, uniform channels, there may be some local pressure differential between adjacent channels. However, by appropriately varying flow resistance in these serpentine channels, the pressure differentials may desirably be increased. To some extent, improved flow fields may additionally have interconnections between adjacent channels. Interconnections however may reduce the pressure differentials otherwise obtained by varying the flow resistance of adjacent channels.

Some embodiments of the present improved flow fields may comprise a plurality of fluid distribution channels. Pressure differentials may be induced or increased between each pair of adjacent channels in a manner similar to that for a single pair of adjacent flow field channels. For instance, this may be accomplished by having every other channel be of the same design.

The improved flow fields are particularly suitable for use in solid polymer electrolyte fuel cells supplied with gaseous reactants. The flow fields may be incorporated either in a flow field plate or integrated into a fluid diffusion layer. Fluid flow resulting from increased pressure differentials between adjacent channels may take place within a porous fluid diffusion layer or through porous flow field landings.

BRIEF DESCRIPTION OF THE DRAWINGS

FIG. 1 is a schematic diagram of a typical solid polymer electrolyte fuel cell stack comprising flow field plates.

DETAILED DESCRIPTION OF PREFERRED EMBODIMENT(S)

Figure 2A:
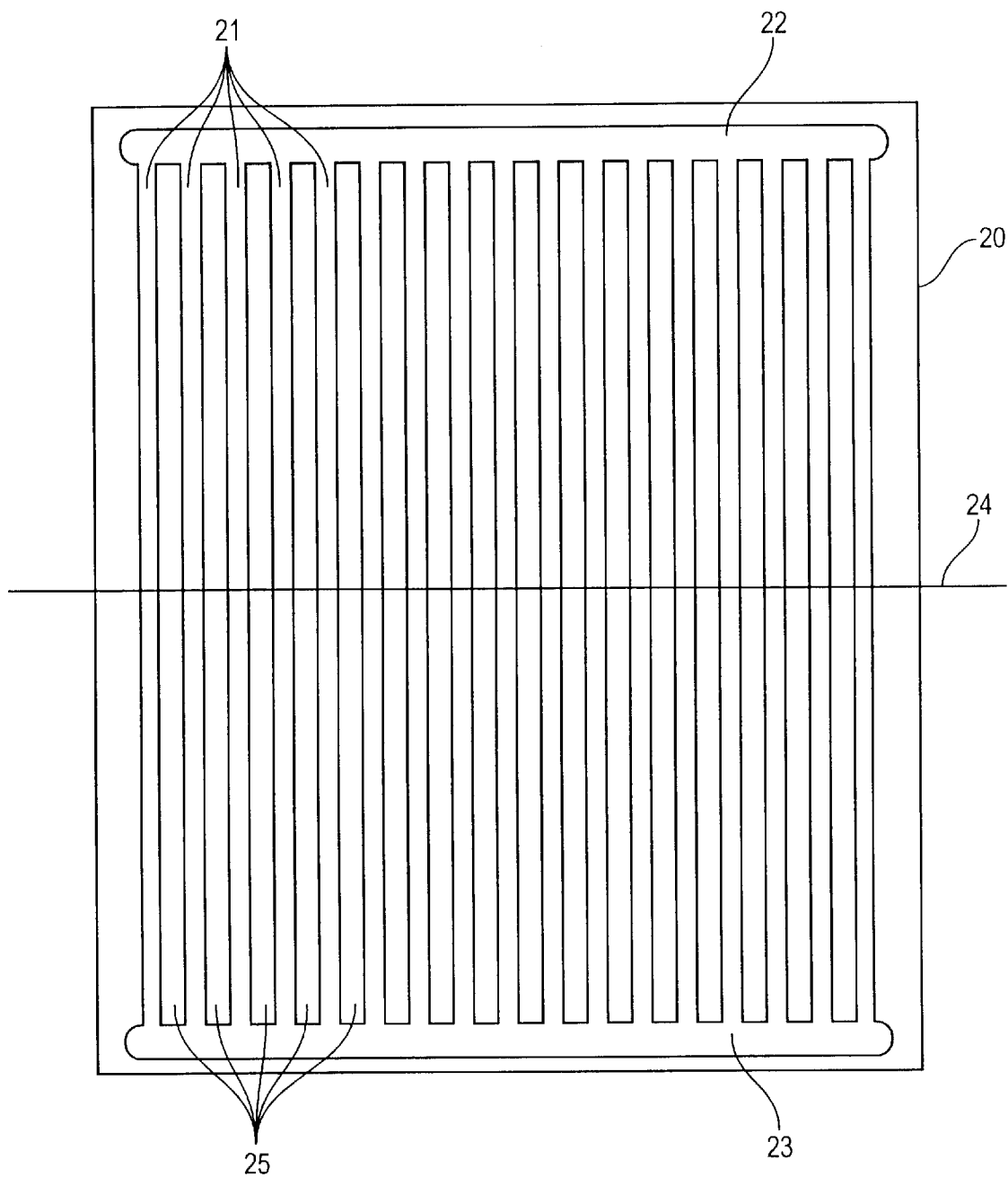
FIG. 2a shows a prior art flow field plate comprising a plurality of straight parallel reactant distribution channels with uniform cross section.

A schematic diagram of a typical solid polymer fuel cell stack is depicted in FIG. 1. For simplicity, FIG. 1 shows only one cell in the fuel cell stack. Stack 1 comprises a membrane electrode assembly consisting of solid polymer electrolyte membrane 2 sandwiched between cathode 3 and anode 4. (The materials are depicted schematically and not drawn to scale.) Cathode 3 comprises porous fluid diffusion layer 5 and catalyst layer 7. Anode 4 comprises porous fluid diffusion layer 6 and catalyst layer 8. Fluid diffusion layers 5, 6 serve as electrically conductive backings and mechanical supports for catalyst layers 7, 8. Fluid diffusion layers 5, 6 also serve to distribute fluid reactants from flow field plates 9, 10 to catalyst layers 7, 8. During operation, oxidant (typically air) and fuel (typically hydrogen) are supplied to flow field plates 9 and 10 respectively at inlets 11 and 13 respectively. The oxidant and fuel streams exhaust from stack 1 at outlets 12 and 14 respectively. During operation, power is delivered to a load depicted as resistor 15.

Flow fields are incorporated in flow field plates 9, 10 with fluid distribution channels 16, 18 which deliver reactants directly to surfaces of diffusion layers 5, 6. Flow field plates also comprise landings 17, 19 which form the walls of channels 16, 18 and which mechanically support diffusion layers 5, 6. The surfaces on diffusion layers 5, 6 that contact landings 17, 19 are not in direct contact with the reactants in flow field plates 9, 10. Thus, to some extent, the reactant distribution in diffusion layers 5, 6 in the vicinity of landings 17, 19 are non-uniform. In certain circumstances, fuel cell performance may be improved by improving the reactant distribution in these regions. Also, to some extent, water may tend to accumulate in these regions resulting in blockage. In particular, product water may tend to accumulate near landings 17 in diffusion layer 5. In certain circumstances, fuel cell performance may be improved by removing water more effectively in these regions.

FIG. 2a shows a prior art flow field plate 20 comprising a plurality of straight parallel reactant distribution channels 21 separated by landings 25 with uniform cross section. The inlet ends of channels 21 are connected to inlet manifold 22 and the outlet ends are connected to outlet manifold 23. The resistance to reactant flow is essentially constant over the channel length since the channel cross section is essentially constant throughout. The pressure in each channel essentially remains isobaric with adjacent channels from inlet to outlet. The pressure in each channel along any plane normal to the flow direction (for example, the plane represented by line 24 in FIG. 2a) is constant and thus there is essentially no pressure drop between channels along normal planes. A qualitative plot of the pressure drop in a channel 21 as a function of channel length from inlet to outlet is shown in FIG. 3b. (This pressure plot is also denoted 21.) A disadvantage of straight channel flow fields is that, without a substantial pressure differential between adjacent channels, reactant distribution and water management may not be desirable in regions of a diffusion layer contacting the landings in the flow field plate.

Figure 2B:
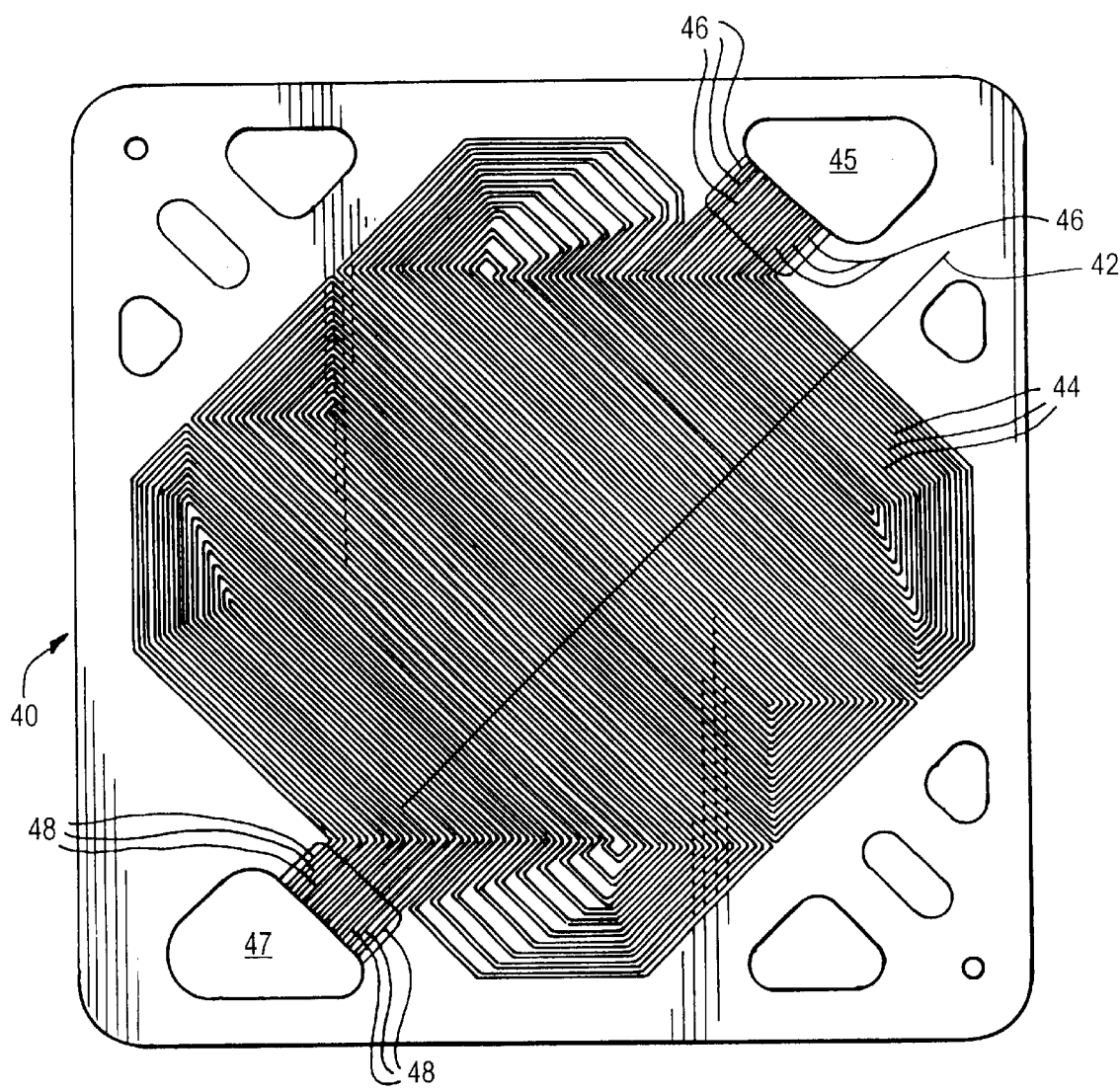
FIG. 2b shows a prior art flow field plate comprising a plurality of serpentine parallel reactant distribution channels with substantially uniform cross section.

FIG. 2b shows a prior art flow field plate 40 comprising a plurality of serpentine parallel reactant distribution channels 44 with substantially uniform cross section throughout. The inlet ends 46 of channels 44 are connected to inlet manifold 45 and the outlet ends 48 are connected to outlet manifold 47. Except at bends, the resistance to reactant flow is essentially constant over most of the channel length. Here, the pressure in each channel along a plane normal to the flow direction (for example, the plane represented by line 42 in FIG. 2b) may not be the same since the channel length from inlet manifold 45 to the normal plane for each channel may differ. Thus, there may be pressure drops between channels along normal planes.

Figure 3A:
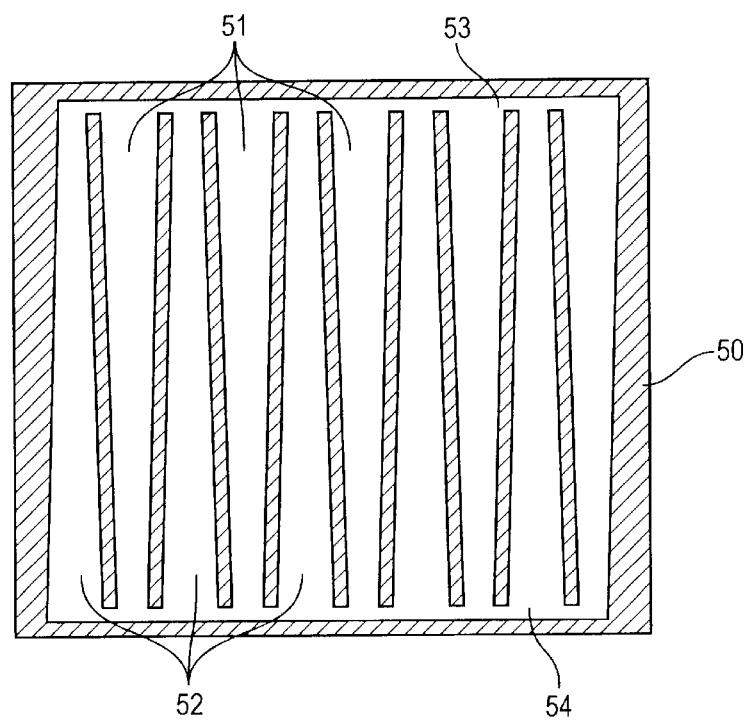
FIG. 3a shows a flow field plate comprising a plurality of reactant distribution channels in which the channel width increases monotonically from inlet to outlet in every other channel and decreases monotonically from inlet to outlet in the remaining channels.
Figure 3B:
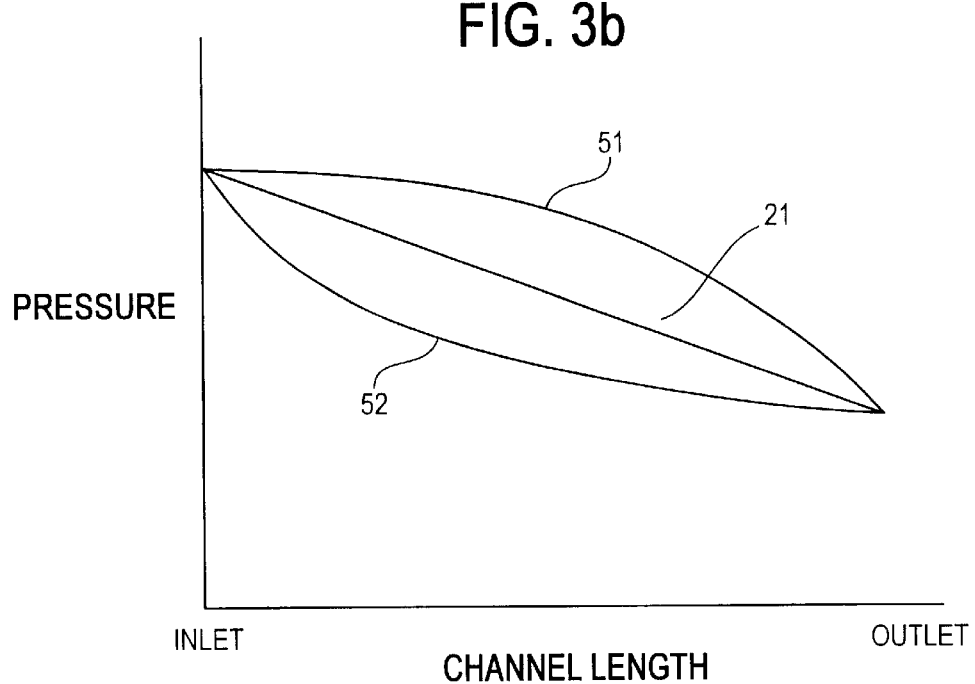
FIG. 3b is a graph that qualitatively depicts channel reactant pressures as a function of channel length for a variety of flow field designs.

FIG. 3a shows an embodiment in accordance with the present improved flow fields in which flow field plate 50 comprises a plurality of fluid distribution channels 51, 52 with varying cross section. As shown in FIG. 3a, the width of channels 51 decreases monotonically from inlet manifold 53 to outlet manifold 54. (The variation in cross section has been exaggerated in FIG. 3a for purposes of illustration.) The width of channels 52 however increases monotonically from inlet manifold 53 to outlet manifold 54. In flow field plate 50, channels 51 alternate with channels 52 and thus each channel 51 is adjacent to channel/s 52 and vice versa (except for channels to the far left or right).

The channels 51, 52 in flow field plate 50 are not uniform in cross section and thus the resistance to flow varies with channel length. In a channel, the smaller the cross section, the faster the relative fluid velocity. The change in the fluid velocity combined with the change in the hydraulic diameter of a channel cause the pressure to vary along the channel differently than it would in a straight channel. The equation below describes the theoretical pressure drop in a tapered channel assuming the flow is single phase:

$$P(x) = Pin - \rho(x) \left[ \left[ f \int_0^x \frac{p(x) \cdot F(x)^2}{8 \cdot (Ax)^3} dx \right] + \frac{F(x)^2}{2 \cdot A(x)^2} \right]$$

In this equation, P(x) is the pressure at any point x along the channel, Pin is the inlet pressure, p(x) is the fluid density, f is an empirical friction factor, p(x) is the channel's cross sectional perimeter, F(x) is the fluid flow, and A(x) is the cross sectional area of the channel. FIG. 3b shows an estimated qualitative plot of the difference in pressure between adjacent channels 51 and 52 (also denoted 51 and 52 respectively). As shown in FIG. 3b, there is a pressure differential between adjacent channels over their entire length. Within certain limits, this differential can be engineered such that the higher pressure differentials occur where it is most desired. Compared to the prior art flow field in FIG. 2a, cross channel convective flow is thus enhanced thereby improving reactant distribution and/or water removal in regions around the flow field landings.

An alternative flow field plate (not shown) in which the depth of the channels varies instead of the width could provide similar benefits as that of the flow field plate depicted in FIG. 3a. For instance, channels whose depth decreases monotonically from the inlet to outlet manifold could be used instead of channels 51, and channels whose depth increases monotonically could be used instead of channels 52. Such a flow field plate would be characterized by a similar pressure versus channel length relationship as that of the flow field plate in FIG. 3a.

Not all the channels of a flow field need to have variable cross section to induce a pressure drop therebetween. For instance, an alternative flow field plate (not shown) to that of FIG. 3a may be considered in which channels 52 are simply straight channels of uniform cross section. The pressure versus channel length in such straight channels would then be linear and similar to that of plot 21 in FIG. 3b. The pressure difference between the channels in such a case would then be represented by the difference between plots 21 and 51 in FIG. 3b.

Further, the channels of a flow field do not need to have a variable cross section along the entire channel length. For instance, it may only be desirable to induce pressure differentials between channels over the last half portion of a flow field plate. This might then be accomplished by varying the channel cross sections over just this last half portion.

Figure 4:
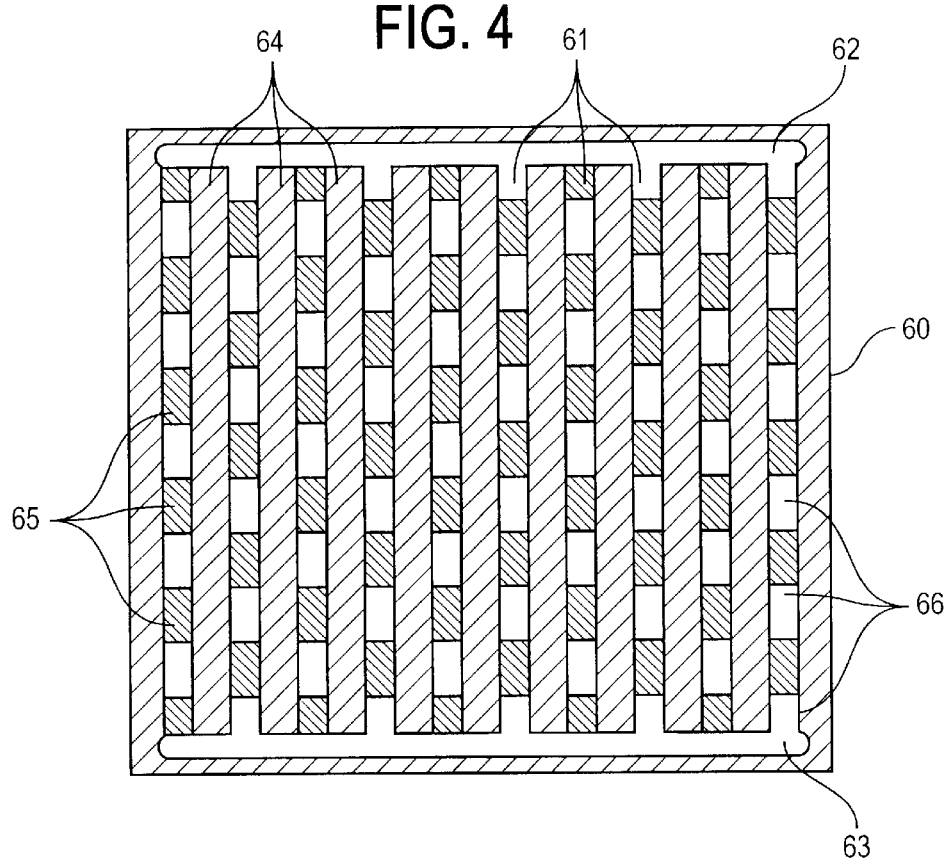
FIG. 4 shows a flow field plate comprising a plurality of straight reactant distribution channels in which the channel depth varies cyclically in the reactant flow direction and in which each channel is half a cycle out of phase with its neighboring channels.

FIG. 4 shows another embodiment in accordance with the present improved flow field in which the channel depth varies cyclically in the reactant flow direction and in which each channel is half a cycle out of phase with its neighboring channels. Flow field plate 60 comprises a plurality of straight reactant distribution channels 61 connected to inlet manifold 62 and outlet manifold 63. Landings 64 separate channels 61. Two discrete channel depths are employed in channels 61. The relatively deep channel portions are represented by shaded portions 65 and the relatively shallow portions are represented by unshaded portions 66. In each pair of adjacent channels 61, the relatively deep portions 65 are adjacent to relatively shallow portions 66 and vice versa.

In the flow field of FIG. 4, the fluid velocity is slower in a relatively deep channel portion than in a shallow one and thus the pressure will be higher in a relatively deep channel portion than in a shallow one. The actual pressure profiles and pressure differences between channels that are obtained versus channel length will depend on various geometric factors (for example, depths of deep and shallow portions, number of portions, etc.). In all cases however, non-zero pressure differences between channels may be obtained which vary in a cyclical manner with channel length.

Figure 5:
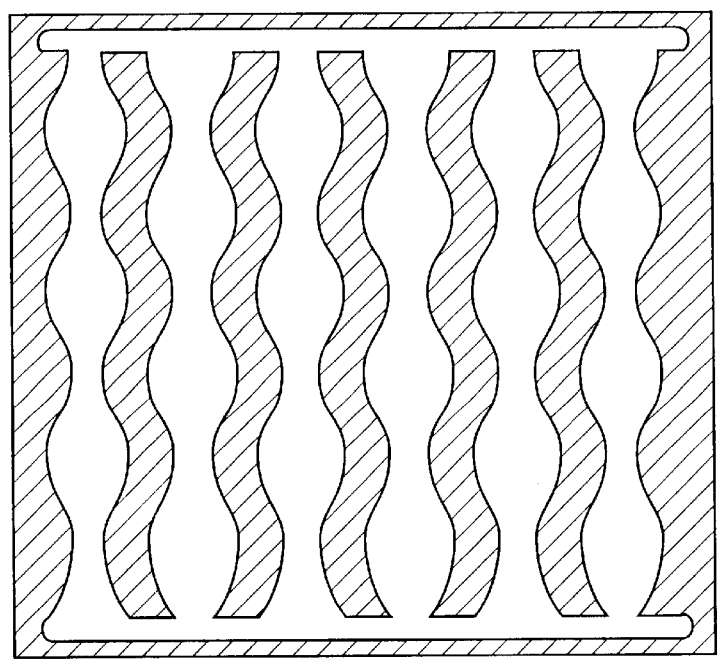
FIG. 5 shows a flow field plate comprising a plurality of reactant distribution channels in which the channel width varies cyclically with an hourglass shape.

FIG. 5 shows another embodiment in which the channel width varies cyclically in the reactant direction and in which each channel is half a cycle out of phase with its neighboring channels. As shown in FIG. 5, the channel width varies cyclically with an hourglass shape. Again, non-zero pressure differences between channels may be obtained which vary in a cyclical manner with channel length.

Figure 6:
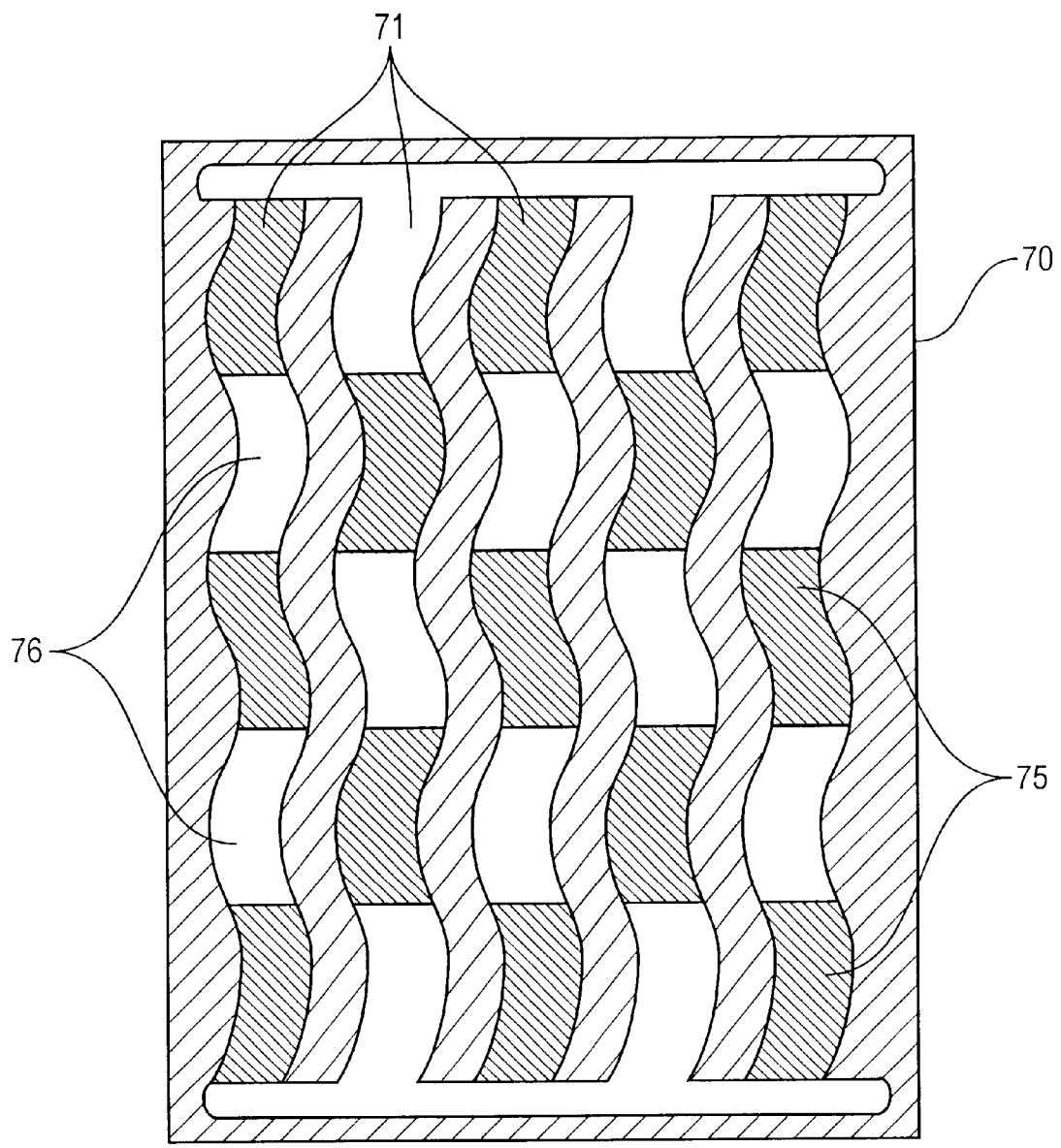
FIG. 6 shows a flow field plate comprising a plurality of reactant distribution channels with varying cross section and with a serpentine component.

Various other flow field patterns may be contemplated that combine the advantages of increased pressure differentials between channels with other desirable features. For instance, certain preferred materials for use as diffusion layers may be structurally weak and may flex or deflect into the flow field unacceptably if an excessive length of material is left unsupported by the flow field plate. In FIGS. 3a and 4, the material directly over a channel is unsupported over the whole channel length running from the inlet to outlet manifold. FIG. 6, on the other hand, shows a flow field plate 70 comprising a plurality of reactant distribution channels 71 with varying cross section and with a serpentine component. In FIG. 6, the depth of the channels varies cyclically as in the flow field plate of FIG. 4 (that is, relatively deep channel portions are represented by shaded portions 75 and relatively shallow portions are represented by unshaded portions 76) and thus pressure differentials between adjacent channels may be increased. In addition though, the serpentine component serves to better support the diffusion layer and to reduce the unsupported lengths of diffusion layer material. In another variation, flow field patterns may be contemplated in which some additional channels are employed that are isolated (that is, not connected to either manifold) or are interdigitated (that is, connected to one manifold).

Certain of the aforementioned flow field plate embodiments are symmetrical in that the channel pressure characteristics would be the same regardless of the direction of reactant flow between the manifolds. Such embodiments may be preferred for use in fuel cells employing "flow switching" (which involves switching the reactant flow direction for purposes such as preventing membrane dehydration).

In the preceding embodiments, a geometric characteristic of the channel cross section is varied in order to vary resistance to flow in the channels. However, any means for varying the flow resistance may be contemplated to induce or increase pressure differentials between channels. For instance, channel linings characterized by different drag coefficients for the reactant might be employed instead.

The following examples are provided to illustrate certain aspects and embodiments of the invention but should not be construed as limiting in any way.

EXAMPLE 1

Figure 7:
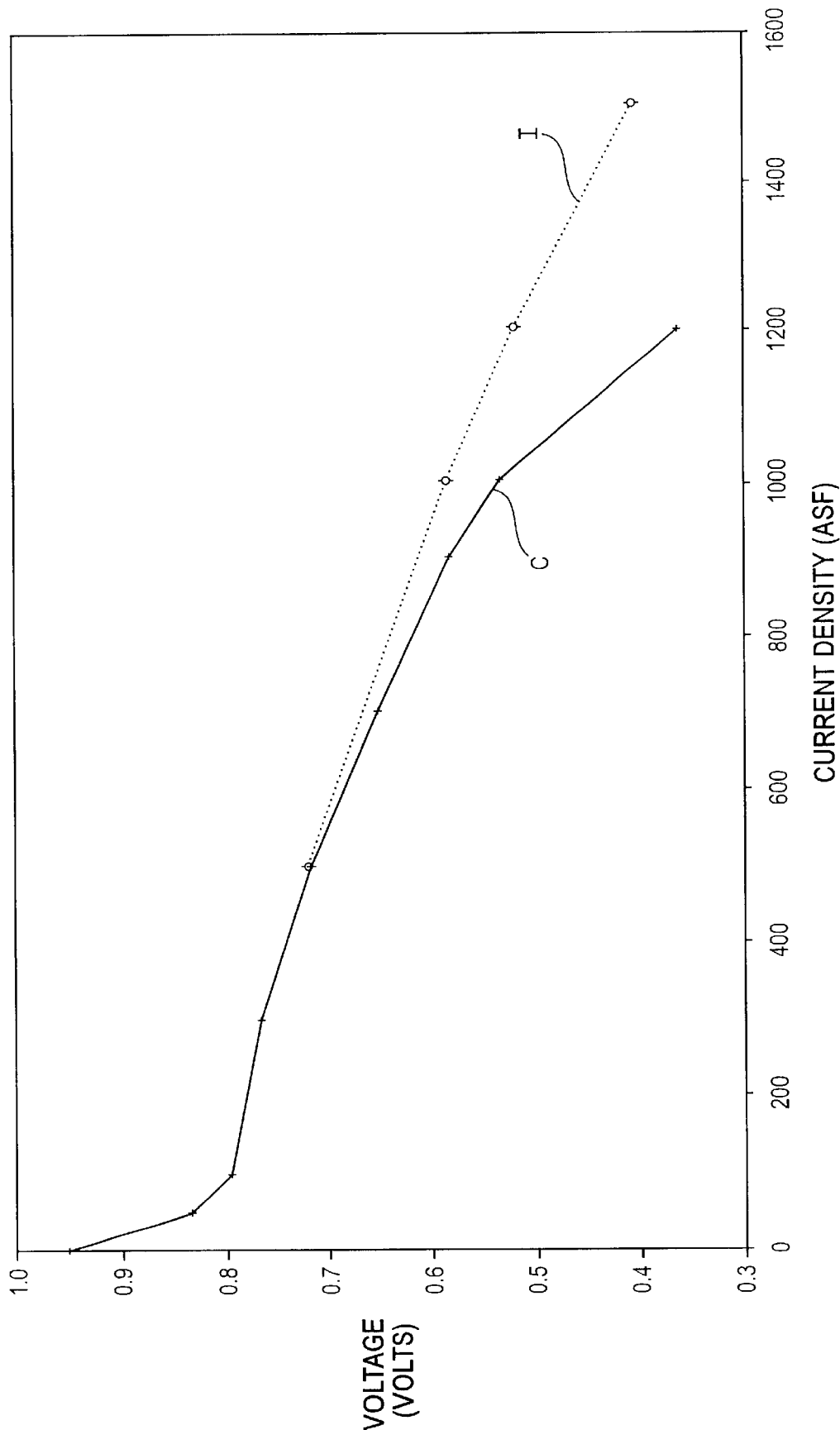
FIG. 7 shows cell voltage as a function of current density for the fuel cells tested in Example 1.

Two solid polymer electrolyte fuel cells were assembled that employed membrane electrode assemblies with platinum catalyzed electrodes and perfluorosulfonic acid membrane electrolyte. In both sets of cathodes and anodes, carbon-supported Pt catalyst was deposited on porous carbon fibre substrates. The cells both employed serpentine flow field plates similar to that shown in FIG. 2b and made of graphite clamped between end plates. However, in one cell, comparative cell C, the flow field channels for both reactants were uniform in cross section (0.062 inches (0.157 centimeters) wide and 0.050 inches (0.127 centimeters) deep). In the other cell, test cell I, the flow field plates were similar except that the depth of the cathode flow field plate varied cyclically with length. In test cell I, the channel depth varied stepwise between 0.020 inches (0.051 centimeters) and 0.060 inches (0.152 centimeters) deep in steps approximately 0.3 inches (0.8 centimeters) in length. Further, the cathode flow field was arranged such that each channel depth was half a cycle out of phase with that of any adjacent channels (that is, a shallow portion in one channel was adjacent to deep portions in neighboring channels and vice versa). The performance of the two fuel cells was determined by measuring cell voltage while operating at various current densities on air and hydrogen reactants. Air and hydrogen were both supplied at 30 pounds per square inch gauge (psig) (207 kPa) and at stoichiometries of 2 and 1.5 respectively. (Herein, stoichiometry is defined as the ratio of the rate at which reactant is supplied to the fuel cell divided by the rate at which the reactant is consumed in the electrochemical reactions in the fuel cell.) Both cells were operated at 80° C. FIG. 7 shows the cell voltage as a function of current density for cells I and C. Cell I shows superior performance in that it exhibits higher cell voltages at higher current densities.

EXAMPLE 2

Computational fluid dynamic analyses were performed to determine pressure and flow characteristics in a high aspect ratio cathode flow field plate design with straight parallel flow channels. The high aspect ratio plate design under consideration was approximately 1.75 inches (4.45 centimeters) wide by 12 inches (30.5 centimeters) long and comprised 39 straight channels. For straight channels having uniform cross sections along their entire length (as depicted in FIG. 2a), no cross channel pressure gradients are expected along planes normal to the reactant flow direction and hence no cross channel flow is expected.

Analyses were performed however on a similar design except that the channels were considered to have a cyclically varying width with a modified hourglass shape. That is, the channel widths varied stepwise between 0.063 inches (0.160 centimeters) and 0.040 inches (0.102 centimeters) wide in steps approximately 0.5 inches (1.3 centimeters) in length. Further, the flow field was considered to be arranged such that each channel width was half a cycle out of phase with that of any neighboring channels. In the analyses, a conventional porous carbon fibre substrate was considered to be adjacent the modified flow field plate thereby allowing for cross flow between channels. It was evident from the analyses that significant cyclical pressure differentials and reactant flow streamlines should exist between adjacent channels. Cross channel flow streamlines were at relative maxima in the vicinity of the transitions in channel width. Thus, this modified hourglass flow field design would be expected to result in significant cross channel flows in an adjacent diffusion layer.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A flow field for supplying a fluid reactant to an electrochemically active area in a fuel cell, said flow field comprising at least two adjacent fluid distribution channels, and each of said two adjacent channels connected at an inlet end to an inlet manifold and connected at an exhaust end to an outlet manifold, said flow field characterized in that
    (a) the cross section of one of said two adjacent channels varies from inlet to outlet whereby the resistance to flow of said fluid reactant along at least one of said two adjacent channels varies from inlet to outlet; and
    (b) the cross sections of each of said two adjacent channels differ over at least about half of the channel length whereby the resistance to flow of said fluid reactant differs between each of said two adjacent channels over at least about half of the channel length.

2. The flow field of claim 1 wherein a geometric characteristic of the cross sections of each of said two adjacent channels differs along at least about half of said channel length.

3. The flow field of claim 2 wherein the width of one of said two adjacent fluid distribution channels decreases monotonically from said inlet end to said outlet end.

4. The flow field of claim 3 wherein the width of the other of said two adjacent fluid distribution channels increases monotonically from said inlet end to said outlet end.

5. The flow field of claim 2 wherein the depth of one of said two adjacent fluid distribution channels decreases monotonically from said inlet end to said outlet end.

6. The flow field of claim 5 wherein the depth of the other of said two adjacent fluid distribution channels increases monotonically from said inlet end to said outlet end.

7. The flow field of claim 1 wherein a geometric characteristic of one of said channel cross sections varies cyclically along at least about half of said channel length.

8. The flow field of claim 7 wherein said geometric characteristic of the other of said channel cross section varies with the same period and out of phase with that of said one of said channel cross sections along at least about half of said channel length.

9. The flow field of claim 8 wherein said geometric characteristic of the other of said channel cross sections varies half a cycle out of phase with that of said one of said channel cross sections along at least about half of said channel length.

10. The flow field of claim 7 wherein said geometric characteristic of one of said channel cross sections varies between two discrete values.

11. The flow field of claim 7 wherein said geometric characteristic of one of said channel cross sections is the width.

12. The flow field of claim 11 wherein said width of said one of said channel cross sections varies with an hour glass shape.

13. The flow field of claim 7 wherein said geometric characteristic of one of said channel cross sections is the depth.

14. The flow field of claim 7 wherein said two adjacent channels are parallel.

15. The flow field of claim 14 wherein said two adjacent channels are substantially linear.

16. The flow field of claim 14 wherein said adjacent channels are serpentine.

17. The flow field of claim 1 comprising at least one interconnection between said two adjacent channels.

18. The flow field of claim 1 comprising a plurality of pairs of fluid distribution channels, each of said fluid distribution channels connected at an inlet end to said inlet manifold and connected at an exhaust end to said outlet manifold, said flow field characterized in that
    (a) in each of said plurality of pairs of adjacent channels, a characteristic of the cross section of one of said channels varies from inlet to outlet whereby the resistance to flow of said fluid reactant along each of said plurality of channels varies from inlet to outlet; and
    (b) in each of said plurality of pairs of adjacent channels, a characteristic of the cross sections of each of said channels differs along at least about half of the channel length whereby the resistance to flow of said fluid reactant in any two adjacent in each pair channels differs over at least about half of said channel length.

19. The flow field of claim 18 wherein the resistance to flow of said fluid reactant in every other channel is the same in at least about half of said channel length.

20. The flow field of claim 1 wherein said flow field is incorporated in a flow field plate.

21. The flow field of claim 1 wherein said flow field is integrated into a fluid diffusion layer.

22. The flow field of claim 1 wherein the mass flow of said fluid reactant in each of said two channels is essentially the same.

23. A fuel cell comprising the flow field of claim 1.

24. A solid polymer electrolyte fuel cell comprising the flow field of claim 1.

25. The fuel cell of claim 23 wherein said fluid reactant is a gas.

26. A method of improving water management in a fuel cell using a flow field in which said flow field comprises at least two adjacent fluid distribution channels through which a fluid reactant flows and each of said two adjacent channels is connected at an inlet end to an inlet manifold and connected at an exhaust end to an outlet manifold, said method comprising:

(a) varying the cross section of one of said two adjacent channels from inlet to outlet whereby the resistance to flow of said fluid reactant along each of said two adjacent channels from inlet to outlet; and (b) varying the cross sections of each of said two adjacent channels so that said channels differ along at least about half of said channel length whereby the resistance to flow of said fluid reactant in each of said two adjacent channels such that said resistance to flow differs in each of said two adjacent channels over a portion of channel length, thereby increasing pressure differences between said two adjacent channels in at least about half of said channel length.

27. A method of improving the distribution of a fluid reactant to an electrochemically active area in fuel cell using a flow field in which said flow field comprises at least two adjacent fluid distribution channels through which a fluid reactant flows and each of said two adjacent channels is connected at an inlet end to an inlet manifold and connected at an exhaust end to an outlet manifold, said method comprising:

(a) varying a characteristic of the cross section of one of said two adjacent channels from inlet to outlet whereby the resistance to flow of said fluid reactant along each of said two adjacent channels from inlet to outlet; and (b) varying a characteristic of the cross sections of each of said two adjacent channels so that said channels differ along at least about half of said channel length whereby the resistance to flow of said fluid reactant in each of said two adjacent channels such that said resistance to flow differs in each of said two adjacent channels over a portion of channel length; thereby increasing pressure differences between said two adjacent channels in at least about half of said channel length.

\* \* \* \* \*

UNITED STATES PATENT AND TRADEMARK OFFICE
CERTIFICATE OF CORRECTION

PATENT NO. : 6,586,128 B1
DATED : July 1, 2003
INVENTOR(S) : Mark C. Johnson, David P. Wilsinson and Mehrzad Tabatabaian It is certified that error appears in the above-identified patent and that said Letters Patent is hereby corrected as shown below:

<u>Title page,</u>
Item [75], Inventors, please delete "John Kenna, Vancouver (CA); Olen R. Vanderleeden, Coquitlam (CA); Joerg Zimmerman, Vancouver (CA)".

<u>Column 3,</u>
Line 16, delete "macroporots" and insert -- macroporous --.

<u>Column 12,</u>
Line 9, after "in" and before "fuel", insert -- a --.

Signed and Sealed this

Eighteenth Day of May, 2004

JON W. DUDAS
*Acting Director of the United States Patent and Trademark Office*